United States Patent
Sheedy et al.

(10) Patent No.: US 10,540,171 B2
(45) Date of Patent: Jan. 21, 2020

(54) STATE CAPTURE AND RETRIEVAL FOR RAPID DEPLOYMENT ENVIRONMENTS

(71) Applicant: Business Objects Software, Ltd., Dublin (IE)

(72) Inventors: Paul Sheedy, Dublin (IE); Conor McEvoy, Dublin (IE); Reiner Hille-Doering, Karlsruhe (DE); Christof Engel, Rauenberg (DE)

(73) Assignee: Business Objects Software, Ltd., Dublin (IE)

( * ) Notice: Subject to any disclaimer, the term of this patent is extended or adjusted under 35 U.S.C. 154(b) by 0 days.

(21) Appl. No.: 15/857,845

(22) Filed: Dec. 29, 2017

(65) Prior Publication Data

US 2019/0205120 A1    Jul. 4, 2019

(51) Int. Cl.
*G06F 9/445* (2018.01)
*H04L 29/08* (2006.01)
(Continued)

(52) U.S. Cl.
CPC ........... *G06F 8/656* (2018.02); *G06F 3/0482* (2013.01); *G06F 3/04842* (2013.01); *G06F 8/71* (2013.01)

(58) Field of Classification Search
CPC . G06F 8/61; G06F 8/65; G06F 16/954; G06F 17/241; G06F 17/243; G06F 8/10; G06F 8/20; G06F 8/71; G06F 8/656; G06F 3/0482; G06F 3/04842; G06F 16/214; G06F 8/63; H04L 41/22; H04L 67/10; H04L 67/34; G06Q 10/06; G06Q 10/10;
(Continued)

(56) References Cited

U.S. PATENT DOCUMENTS 6,622,302 B1 *   9/2003   Delaney .................... G06F 8/65
                                                      717/168
8,819,695 B2 *   8/2014   Daute ....................... G06F 8/71
                                                      718/106
(Continued)

OTHER PUBLICATIONS

Cerbulescu et al., Proposed Architecture to manage critical states predictions in IoT applications, 4 pages (Year: 2017).*
(Continued)

*Primary Examiner* — Thuy Dao
(74) *Attorney, Agent, or Firm* — Mintz Levin Cohn Ferris Glovsky and Popeo, P.C.

(57) ABSTRACT

A state capture designation for an element of an application within an application design environment may be received, indicating that the application, once deployed, will include a state capture functionality for capturing a state of the element, and a state restoration function for restoring the state of the element. Following deployment of the application within a runtime environment, and in response to an invocation of the state capture functionality, a captured state of the element may be stored. A state restoration request for the captured state may be received by way of the state restoration functionality, and following a re-deployment of the application with an update to the element that was included as part of an update to the application within the application design environment. The captured state may then be restored to the updated element, in response to the state restoration request, and within the runtime environment.

17 Claims, 7 Drawing Sheets

(51) Int. Cl.
*G06F 9/44* (2018.01)
*H04L 12/24* (2006.01)
*G06F 8/656* (2018.01)
*G06F 3/0482* (2013.01)
*G06F 3/0484* (2013.01)
*G06F 8/71* (2018.01)

(58) Field of Classification Search
CPC .......... G05B 19/0426; G05B 19/41845; G05B 2219/25428; G05B 15/02; A61M 2005/14268; A61M 2005/16863; A61M 2005/0266; A61M 2005/18
See application file for complete search history.

(56) References Cited

U.S. PATENT DOCUMENTS

| | | | | |
|---|---|---|---|---|
| 8,892,945 | B2* | 11/2014 | Benson | H04L 67/1097 714/15 |
| 8,972,792 | B2* | 3/2015 | Quin | G06F 8/63 714/36 |
| 9,329,941 | B2* | 5/2016 | Liu | G06F 3/0482 |
| 9,851,961 | B2* | 12/2017 | Brant | H04L 67/10 |
| 9,891,907 | B2* | 2/2018 | Searle | H04L 41/082 |
| 10,120,777 | B1* | 11/2018 | Hegarty | G06F 11/3604 |
| 2004/0083476 | A1* | 4/2004 | Zhou | G06F 8/656 718/102 |
| 2008/0005380 | A1* | 1/2008 | Kawasaki | G06F 11/1458 710/15 |
| 2008/0109790 | A1* | 5/2008 | Farnham | G06F 8/71 717/128 |
| 2011/0035629 | A1* | 2/2011 | Noller | G06F 11/3688 714/38.14 |
| 2011/0099544 | A1* | 4/2011 | Haramiishi | G06F 8/654 717/168 |
| 2011/0196842 | A1* | 8/2011 | Timashev | G06F 11/1469 707/679 |
| 2012/0084750 | A1* | 4/2012 | Hardy | G06F 8/24 717/115 |
| 2013/0342358 | A1* | 12/2013 | Kardos | H02J 13/001 340/870.02 |
| 2018/0046634 | A1* | 2/2018 | Iwasaki | G06F 17/30079 |
| 2018/0210727 | A1* | 7/2018 | Elliott | G06F 8/71 |

OTHER PUBLICATIONS

Vorobyov et al., Shadow state encoding for efficient monitoring of block-level properties, 12 pages (Year: 2017).*

* cited by examiner

STATE CAPTURE AND RETRIEVAL FOR RAPID DEPLOYMENT ENVIRONMENTS

TECHNICAL FIELD

This description relates to state capture techniques for software applications.

BACKGROUND

Software applications have typically been developed by expert software developers, and have often been developed as monolithic or modular applications that are designed for use by a large target audience(s) of users. However, in many circumstances, it is difficult to create software applications successfully using related development models. For example, even if the resulting software applications are customizable to some extent, it is difficult to create a software application that is sufficiently targeted for a particular user base. Similarly, even if the software applications can be upgraded using existing upgrade techniques, it is difficult to keep up with the changing needs of even a single set of users. Further, it is often difficult for average, non-technical users to execute desired customizations and upgrades, even when these are available.

It is also possible to utilize a different software development model, in which a plurality of pre-existing software elements can be combined to create a software application having desired features. For example, a software provider may provide the pre-existing software elements and associated development environment. Then, a group of users that is knowledgeable with respect to both the development environment and a targeted user base may utilize the development environment and software elements to design a desired application for the targeted user base.

In these and similar software development models, it is possible to design and deploy desired software applications in a rapid manner. However, the speed and variability with which resulting software applications are developed and deployed can lead, over time, to other demands on the software developers, and to inconsistent or undesirable user experiences for the targeted user base.

SUMMARY

In the present description, a rapid deployment environment is described in which software applications may be created and deployed quickly, and in a highly-customized manner. Moreover, the rapid deployment environment provides techniques for capturing and restoring state information of the designed software applications, even across updates and changes to the software applications that may occur over time.

In this way, for example, a user of a deployed software application may easily save state information during a particular use of the software application. Using the techniques described herein, even if a developer changes the software application prior to a subsequent use thereof by the user, the user will nonetheless still be assured of restoring the saved state information that was captured. Moreover, the software developer is provided with techniques for designating state information that is eligible for capture by users in an easy, flexible manner, and can update and deploy software applications in a fast and reliable manner.

The details of one or more implementations are set forth in the accompanying drawings and the description below.

Other features will be apparent from the description and drawings, and from the claims.

DETAILED DESCRIPTION

Figure 1:
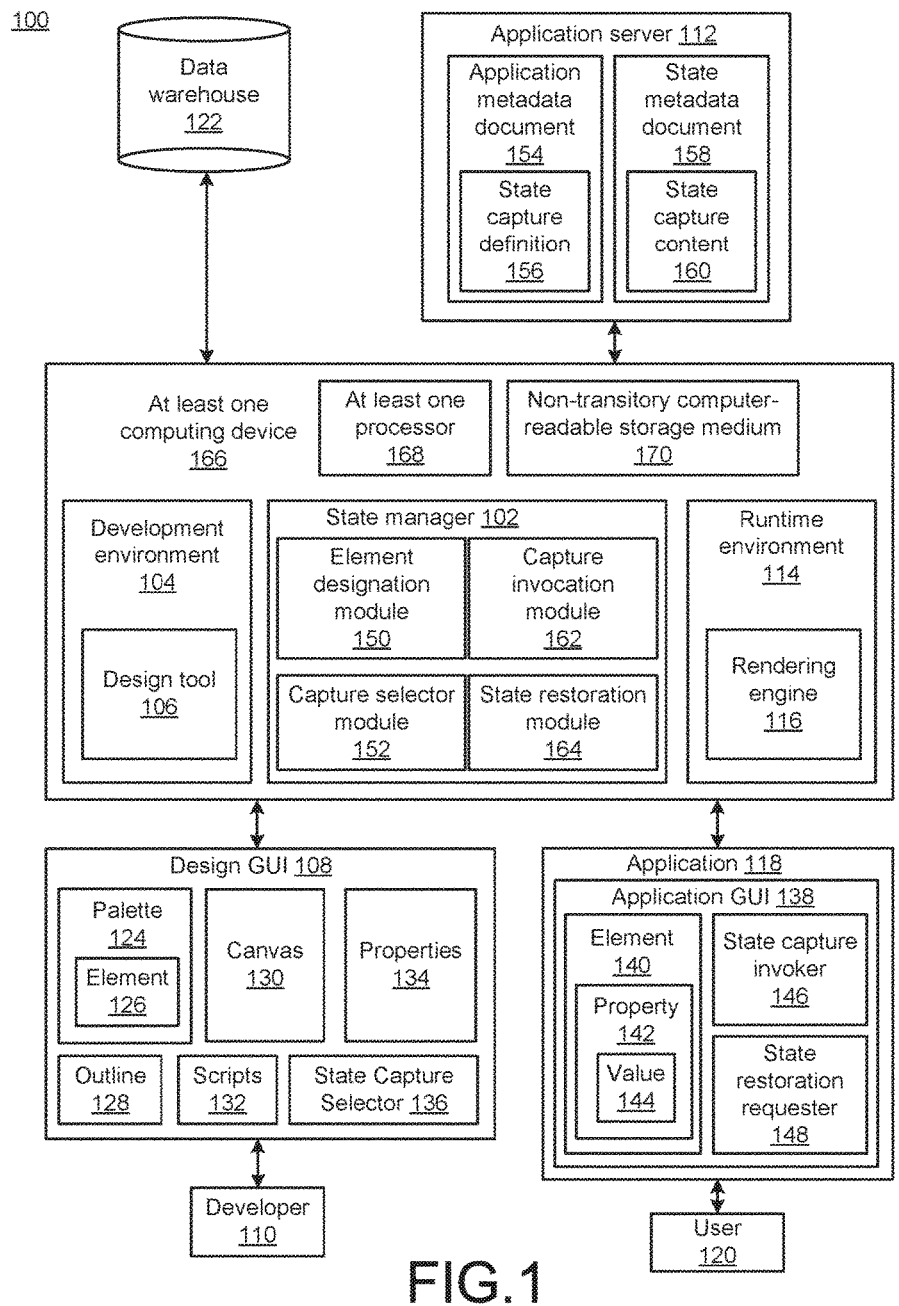
FIG. 1 is a block diagram of a system for state capture and retrieval for a rapid deployment environment.

FIG. 1 is a block diagram of a system 100 for state capture and retrieval for a rapid deployment environment. In the example of FIG. 1, a state manager 102 represents one or more software modules and associated computer hardware configured to operate in conjunction with a development environment 104. The development environment 104 is generally configured to facilitate development of a plurality of software applications, and includes a design tool 106 configured to provide a design graphical user interface (GUI) 108 that is accessed by a developer 110 to develop the one or more software applications.

In FIG. 1, the developer may thus have access to an application server 112 and a runtime environment 114. As shown, the runtime environment 114 may include a rendering engine 116, which may be configured to render a resulting software application 118 for access and use by a user 120.

Although the simplified example of FIG. 1 illustrates the single user 120, it will be appreciated that actual implementations of the system 100 will typically be utilized by a potentially large number of users represented by the user 120, who are accessing a corresponding large number of instances of the application 118. Consequently, it will be appreciated that any following discussion that describes actions of the user 120 will be understood to represent corresponding actions of this plurality of users and associated application instances.

For example, the user 120 may typically utilize the application 118 over a period of time, such as when the user 120 is an employee of an organization, and utilizes the application 118 during normal daily work responsibilities of the user 120. As the user 120 thus manipulates and configures aspects of the application 118, it may occur that the user 120 wishes to save a current state of the application 118 for future use and access. For example, the user 120 may be required to wait for additional input from fellow users, or may be required to attend to one or more separate tasks that do not utilize the application 118, and may desire for the current state to be available when required at such future times.

Although it may be straightforward to save application data of the application 118, including state data, a number of difficulties and complications may arise in the types of scenarios and contexts represented by the system 100 of FIG. 1. In particular, in such contexts, it may occur that the developer 110, representing a potentially large number of developers, has continual or periodic access to the development environment 104, and may be authorized to make changes or other updates to the application 118. Consequently, if an entirety of current application data is saved in order to save and access desired state data, it may be difficult or impossible to reload or otherwise access the saved state data at a later point in time, after the application 118 has been updated or changed.

For example, a particular application element, such as a checkbox that has been checked by the user 120, may be saved in order to maintain a current, checked state of the checkbox. However, such an approach may be problematic if the developer 120 then changes, replaces, or repurposes the checkbox during a subsequent design change, because the checked checkbox no longer exists in the form that was present when the application state was saved.

In other words, without access to the state manager 102 and associated aspects of the system 100, the user 120 might save application state data for the application 118 when the user 120 finds recurrent application state to be particularly appealing or useful. However, if the user 120 were to attempt to reload or otherwise access the saved application data after a period of time during which the developer 110 modified the application, then the user 120 would be in danger of receiving an error message, or of having the saved application state data reloaded incorrectly, or receiving some other undesirable outcome.

In the context of the system 100 of FIG. 1, in contrast, the state manager 102 ensures that saved application state data remains available and accessible in a desired format, even when the developer 110 makes updates to the application 118 over time. Consequently, the user 120 obtains at least the benefits of easily storing and later accessing desired application state data. Moreover, the developer 110 is provided with an ability to offer these and related benefits and advantages, without experiencing additional challenges and difficulties in developing and updating the application 118. In fact, the system 100 of FIG. 1 provides the developer 110 with convenient and intuitive aspects of the design GUI 108 and associated operations of the state manager 102, so that the developer 110 is facilitated and supported during software development activities.

In one type of example scenarios in which the system 100 of FIG. 1 may be deployed, as referenced above and described in detail below, it may occur that the system 100 is deployed by an organization in its capacity as employer to both a team of software developers (including the developer 110), as well as other employees (including the user 120) who utilize applications provided by the various developers, such as web-based analytical or analytics applications.

For example, such an organization may employ many different ones of such users, each of which may be tasked with daily responsibilities, many of which may be facilitated through the use of one or more associated software applications. In many cases, such organizations may utilize software applications that are provided by separate organizations that specialize in the creation and sale of such software applications. In practice, however, it may be difficult or impossible for such software providers to create, sell, and maintain software applications to a large and diverse user base of organizations. For example, the different needs of different organizations may demand different functionalities, such as when a company producing automobiles has different needs then a company publishing a magazine. Consequently, even if the software provider could provide all necessary features and aspects for such diverse groups, the resulting software would likely include features that would be of little use to many of the purchasing organizations.

Further, even within a single organization, the needs of the organization with respect to purchased software may change over time. In some cases, such changes may occur rapidly, while other organizations may only experience relatively slower or smaller changes. For these and other reasons, rather than attempting to provide all necessary software applications and associated updates to a customer base, a software provider may instead provide each customer or group of customers with abilities and tools to create their own specialized versions of desired software and associated functionalities, including an ability to maintain, upgrade, update, or otherwise change the resulting software applications over time.

Consequently, in the example of FIG. 1, the development environment 104 and the runtime environment 114 may be understood to represent and provide such tools that may be purchased, deployed, or otherwise accessed by organizations or other purchasers thereof. Then, as illustrated in the example of FIG. 1, the developer 110 may be provided with suitable access to the development environment 104, while the user 120 may be provided with suitable access to the runtime environment 114.

In the example of FIG. 1, the application 118 may thus be utilized to provide the user 120 with access to data within a data warehouse 122. For example, in the referenced scenarios in which a plurality of users access and utilize instances of the application 118, the data within the data warehouse 122 may generally represent organizational data that is partially or completely available to various ones of such users. For example, the data within the data warehouse 122 may represent inventory data, production data, or transactional data that may be utilized by the various users during the course of their daily responsibilities.

In various example implementations of such scenarios, it may occur that the software provider provides the development environment 104 in conjunction with a plurality of pre-configured elements, represented by an element 126, that are designed to be easily combinable and configurable by the developer 110. In this way, for example, the developer 110 may be facilitated in making desired design choices in a fast, efficient, and straightforward manner. Moreover, the developer 110 may thus represent a user with technical and administrative capabilities that are generally higher than the user 120, without requiring the developer 110 to possess a full scope and extent of technical knowledge that might be required of a developer who does not have access to the types of pre-configured and combinable elements just referenced.

Thus, in the example of FIG. 1, the design GUI 108 is illustrated as including a palette 124 that includes and illustrates the element 126. That is, as may be appreciated from the preceding description, the element 126 represents a plurality of pre-configurable, selectable, and combinable application components that may be utilized in conjunction with one another to provide desired features and functionalities of the application 118. As various ones of the elements represented by the element 126 are selected, configured, and combined, the design GUI 108 provides one or more views for visualizing, tracking, and utilizing the selected elements.

For example, an outline 128 represents a view or portion of the design GUI 108 in which the various selected elements represented by the element 126 are combined and configured. As illustrated in more detail below with respect to FIG. 3, the outline 128 may include a list of all selected elements, including at least some representation of relationships therebetween (e.g., a hierarchically arranged view).

Meanwhile, a canvas 130 provides for a more visual representation of selection, configuration, and design choices made with respect to elements selected from the palette 124. For example, the canvas 130 may be utilized by the developer 110 to execute a drag-and-drop operation of the element 126, to thereby include an instance of the element 126 within the canvas 130, and ultimately within the application 118. In other words, for example, the canvas 130 may be utilized to provide the developer 110 with a visual representation of a user experience desired for the user 120.

As also described below, the elements represented by the element 126 may include a wide variety of potential application elements, and may include, or be referred to as, components, controls, control elements, or similar terms. For example, the element 126 may represent a visual control element, or a data input/output element. In various non-limiting examples, the element 126 may thus represent a checkbox, drop-down menu, text field, pop-up window, or virtually any other type of visual design element that may be included graphically within the application 118 for viewing by the user 120.

In other implementations, however, the element 126 also may represent an element of the application 118 that is not designed to be visible or viewable to the user 120, such as a particular type or source of data included within the data warehouse 122. For example, such a data source might be included as one element, while a drop-down menu or other visual/graphical selection element may be included for the purpose of designating or selecting the data source element. Provided in conjunction with one another, only the visual/graphical selection element would be viewable as such within the canvas 130, and ultimately during operations of the application 118.

Nonetheless, the combination of the data source element and the selected element may be included in relation to one another within the outline 128. Consequently, it may be observed that the outline 128 and the canvas 130 provide different and overlapping features and advantages with respect to facilitating operations of the developer 110 in creating and updating the application 118.

By way of further example, even when all of the elements represented by the element 126 are selected for inclusion within the canvas 130 as graphical/visual elements, the outline 128 may nonetheless provide advantageous features. For example, in such scenarios, and related scenarios, it may occur that the various selected elements are designed and included in a manner that may involve partially or completely obscuring at least some other ones of the selected elements. In such cases, a utility of the canvas 130 may be reduced with respect to such obscured elements, but the outline 128 would nonetheless be available to the developer 110 to ensure that all included application elements are easily identifiable, selectable, and generally designed correctly.

Further with respect to the design GUI 108, scripts 132 represent actions or other events that may be configured for association with operations of selected ones of the elements represented by the element 126. For example, a particular script may be design to define an action performed by the element 126 when selected for inclusion within the canvas 130, including an action taken in response to a selection or other operation performed by the user 120.

For example, in a simplified example in which the element 126 represents a button, checkbox, or other selection element, a particular script of the scripts 132 may be included in conjunction with the selected element 126 to define, e.g., an event designated to occur in response to a selection of the element 126 by the user 120 in the context of runtime operations of the application 118.

Also in the example of the design GUI 108, properties 134 illustrate a window or portion of the design GUI 108 in which properties of individual elements, such as the element 126, may be displayed. As may be appreciated from the above description, and as explained in further detail below, the term "properties" in this context refers generally to configurable and/or configured aspects or characteristics of the element 126 and other elements of the palette 124. For example, a property may refer to a label, designation, size, dimension, color, sub-element, or virtually any other potential or available characteristic of a given element or a type of element included within the palette 124. Properties also may include potential or configured scripts that are associated with events that may occur in conjunction with a given element.

For example, in a simplified example in which the element 126 represents a checkbox, then the properties 134 displayed for the element 126 may initially represent available or configurable aspects associated with the checkbox. For example, such aspects may include a label that will be displayed in conjunction with the checkbox, a size or color of the checkbox, and an event (defined by a script from the scripts 132) that occurs in a conjunction with a selection of the checkbox. Once the element 126 has been selected for inclusion within the canvas 130 and the outline 128, then the properties 134 may display actual, configured properties that have been defined by the developer 110 in conjunction with selection of the element 126 from the palette 124. For example, the developer 110 may have selected the element 126, and defined properties related to size and color, while not yet having assigned and configured an appropriate event script selected from the scripts 132.

Once the developer 110 has selected and configured all desired elements and associated properties, including selected scripts, the developer may proceed to deploy the application 118. Thus, it will be appreciated that the portions 124-134 of the design GUI 108 generally represent and illustrate example techniques for designing, and ultimately deploying, an application such as the application 118.

In this regard, it will be appreciated that the design GUI 108 is intended merely as an example implementation of a GUI to be used in conjunction with the design tool 106 of the development environment 104. Nonetheless, the design GUI 108 represents the type of development environment that may be used in rapid deployment environments represented by the system 100 of FIG. 1. For example, it will be appreciated that the developer 110 may quickly and easily select from among the available elements using the palette 124, to design and deploy an application using the application server 112 and the runtime environment 114.

At a later time, the developer 110 may simply re-access the developed application from the application server 112, including viewing the previously-selected and configured elements and associated properties and scripts within the design GUI 108 (e.g., as rendered and illustrated within the outline 128 and the canvas 130). At this point, it is straightforward for the developer 110 to use the features and functions of the design GUI 108 to make modifications, changes, or other updates to the previously-deployed application. For example, the developer 110 may simply select the included instance of the element 126 within the canvas 130, and modify associated properties thereof within the properties 134. Similarly, of course, the developer 110 may delete the included instance of the element 126, or include another instance of the element 126, or some other element selected from the palette 124, within the canvas 130. The thus-modified application 118 may then be redeployed using the application server 112 and the runtime environment 114.

As a result of the ease with which the developer 110 may make modifications to the application 118, the user experience of the user 120 may be affected. For example, from a point of view of the user 120, the user 120 may utilize the application 118 at a particular point in time, including saving application state data, as described herein. At some later time, the user 120 may return and access the application 118 again, only to find that the application 118 has been modified in the meantime by the developer 110.

For example, properties of a particular element for which application state data was stored may have changed, or the relevant application element may have been changed or entirely removed from the application 118 by virtue of the changes implemented by the developer 110. For example, if the element 126 represents a checkbox, and the user has saved application state data in which the checkbox has been selected, then the user 120 may return to use the application 118 at a later time, only to find that a label of the checkbox has been changed, or that the checkbox has been replaced in conjunction with inclusion of a drop-down list or other selection technique, or that some other change to the application 118 has been made that impacts the saving and such or accessing of the desired application state data.

Consequently, as referenced above, e.g., with respect to the state manager 102, the design GUI 108 includes a state capture portion or window that provides the developer 110 with an ability to designate an availability and configuration of state capture with respect to a current state of the element 126 within the application 118. In this way, for example, the developer 110 may easily select desired ones of elements chosen from the palette 124 to be provided with state capture and recovery functionalities.

In selecting and designating which of the included elements of the palette 124 will be provided with state capturing and recovery functionalities, the developer 110 also may easily designate a manner in which the captured application state data is obtained, stored, and recovered. For example, the developer 110 may specify that application state data for the element 126 will be saved in conjunction with either a user designation (selection) and/or automatically in the context of other operations of the application 118.

Consequently, in scenarios in which the user 120 is required to designate and invoke desired state capture operations with respect to the element 126, the developer 110 may include appropriate state capture designation elements, for use by the user 120 (e.g., a "save state" selectable button). Similarly, the developer 110 may include a selectable button or other element that may be used by the user 120 to recover previously-saved application state data.

In the example of FIG. 1, the application 118 is illustrated as including an application GUI 138 that conceptually illustrates results of the just-referenced development activities of the developer 110, with respect to various ones of the portions 124-136 of the design GUI 108. For example, as shown, the application GUI 138 includes an element 140, which represents a fully-configured and deployed instance of a selectable element of the palette 124, e.g., the element 126.

As already described and referenced, the element 140 may thus include a property 142, and a value of the property 142 may be selected or configured by, and received from, the user 120. Thus, the value 144 of the property 142 of the element 140, having been designated by the user 120, represents an example of the type of application state that may be captured, stored, and recovered using the system 100 of FIG. 1. For example, continuing the simplified example in which the element 126/140 represents a checkbox, the element 140 may include properties such as size or label(s). Where the property 142 represents the checkable aspect of the checkbox 140, the value 144 would represent the checkbox as either being in a checked state, or an unchecked state.

As also referenced above with respect to the state capture selector 136 of the design GUI 108, the application GUI 138 may be designed and deployed to include a state capture invoker 146 and a state restoration requestor 148. For example, the state capture invoker 146 may represent a button or other selectable element which the user 120 may utilize to designate that the particular, existing value 144 for the property 142 should be saved. Similarly, the state restoration requestor 148 represents a button or other selectable element that may be utilized by the user 120 to recover the value 144 at a later time of use of the application GUI 138 by the user 120. As described, such state restoration may occur, notwithstanding the fact that any of the element 140, or related element or property, may have been changed by the developer 110 during an interim time period between capture of the captured application state using the state capture invoker 146, and the request for restoration of the capture state, using the state restoration requestor 148.

Thus, in practice, the user 120 may utilize the element 140 in conjunction with a current use of the application 118, including, e.g., checking a checkbox of the element 140, to thereby change the value 144 from unchecked to checked, and in conjunction with invocation of the state capture invoker 146 to save the current, captured state for the value 144. The user 120 may then stop use of the application 118 for some duration of time, during which the developer 110 may utilize the design GUI 108 to make some additional update or change to the element 140 and/or the property 142, or related element or property. Subsequent to these design changes, the user 120 may again utilize the application GUI 138 of the application 118, including invoking the state restoration requestor 148 with respect to the value 144. By virtue of operations of the state manager 102, as referenced above and described in more detail below, the previously-captured state of the element 140 (i.e., the previously-existing value 144 of the property 142) may be obtained and restored in a suitable manner, e.g., with respect to the element 140 itself, or in conjunction with one or more elements that replaced the element 140 in conjunction with the changes made by the developer 110.

In order to provide these and other features associated with state capture and retrieval for a rapid deployment environment, the state manager 102 may be understood to operate in conjunction with the development environment 104 and/or the runtime environment 114. That is, for example, the state manager 102 is illustrated as a single, separate module having a plurality of discrete sub-modules. In various example implementations of the system 100 of FIG. 1, portions of the state manager 102 may be implemented in conjunction with, e.g., as part of, the development environment 104, while other portions or sub-modules of the state manager 102 may be implemented in conjunction with, i.e., as part of, the runtime environment 114. For example, For example, as illustrated, the state manager 102 may include an element designation module 150 that is utilized in conjunction with the design tool 106 and the design GUI 108, to thereby enable the state capture selector 136 to designate elements of the palette 124 as being associated with a capability for application state capture. For example, if the developer 110 selects the element 126, such as the checkbox, then the developer 110 may use the state capture selector 136 to invoke the element designation module 150 and designate the element 126 as being configured for capture of a state thereof by the user 120 during a later use of the application 118.

Similarly, a capture selector module 152 may be invoked by the state capture selector 136 to enable the developer 110 to designate a specific manner in which state capture will occur for the designated element 126. For example, as already described, the capture selector module 152 may enable the developer 110 to include and configure the state capture invoker 146 that will ultimately be rendered within the application GUI 138.

Once an initial configuration and deployment of the application 118 has been completed by the developer 110, then, as shown, the application server 112 may be configured to store an application metadata document 154 that defines the various characteristics of the application 118 designed by the developer 110, including a state capture definition 156. As described below, the state capture definition 156 includes at least an identification of application elements having state data that is eligible for capture using the state manager 102.

For example, as shown, the application metadata document 154 may include an eXtensible Markup Language (XML) document that describes all of the selected, configured application elements in a manner that is compatible with rendering by the rendering engine 116. The state capture definition 156, which characterizes and enables the types of application state capture described herein, may designate a separate state metadata document 158 that includes state capture content 160. In other words, the state capture content 160 may be understood to represent, e.g., the particular value 144 of the property 142 that was designated for potential state capture, and that is ultimately captured and saved in response to, e.g., invocation of the state capture invoker 146 by the user 120.

Thus, as illustrated, the application server 112 stores the application metadata document 154, from which the rendering engine 116 of the runtime environment 114 may render the application 118, including the application GUI 138. If the user 120 happens not to elect to save any application state data, and if saving of application state data is not otherwise invoked, then the user 120 may simply obtain the benefit of use of the application 118, as rendered from the application metadata document 154.

If, however, the user 120 (or other operation) invokes state capture of the value 144, such as by selecting the state capture invoker 146, then a capture invocation module 162 of the state manager 102 may be invoked, and operate according to the state capture definition 156 to thereby populate the state capture content 160 within appropriate portion(s) of the application metadata document 154.

At a later time, when the user 120 wishes to restore the previously-captured state, including the value 144, the user 120 may invoke the state restoration requestor 148, which in turn activates a state restoration module 164 of the state manager 102. More particularly, the state loading module 164 may utilize the state capture definition 156 of the application metadata document 154 to identify and utilize the state metadata document 158, including the state capture content 160. In other words, as described in detail below, e.g., with respect to FIGS. 5 and 6, the state restoration module 164 may operate in conjunction with the runtime environment 114 and the rendering engine 116, to combine and jointly render the application metadata document 154 together with the state metadata document 158, and thereby restore the previously-captured state of the application GUI 138, including the value 144.

In the example of FIG. 1, the development environment 104, the state manager 102, and the runtime environment 114 are illustrated as being implemented using at least one computing device 166, which includes at least one processor 168 and a non-transitory compute readable storage medium 170. In other words, it will be appreciated that the development environment 104, the state manager 102, and the runtime environment 114 may be implemented using a single computing device, or a plurality of computing devices in communication with one another, perhaps over a suitable network. The at least one processor 168 represents one or more processors of the one or more such computing devices, operating separately or in parallel with one another. Similarly, the non-transitory computer readable storage medium 170 should be understood to represent one or more memories of the one or more computing devices, used to store relevant data and/or code for implementing, e.g., the state manager 102.

In some implementations, the application server 112 may be understood to provide at least some of the functionality described and illustrated as being provided by the at least one computing device 166. For example, the application server 112 may be configured to implement the runtime environment 114.

Figure 2:
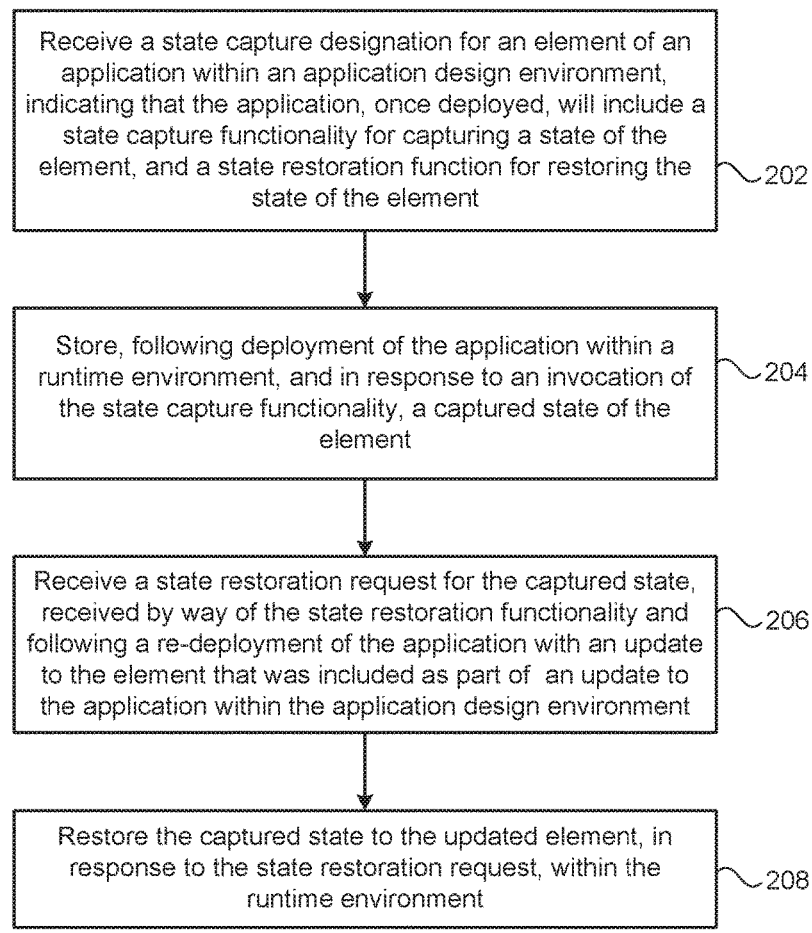
FIG. 2 is a flowchart illustrating example implementations of the system of FIG. 1.

FIG. 2 is a flowchart 200 illustrating example operations of the system 100 of FIG. 1. In the example of FIG. 2, operations 202-208 are illustrated as separate, sequential operations. In various implementations, additional or alternative operations or sub-operations may be included, and/or one or more operation or sub-operation may be omitted. In these and other implementations, it may occur that any two or more operations or sub-operations may occur in a partially or completely overlapping or parallel manner, or in a nested, iterative, branched, or looped fashion.

In the example of FIG. 2, a state capture designation for an element of an application within an application design environment may be received, indicating that the application, once deployed, will include a state capture functionality for capturing a state of the element, and a state restoration function for restoring the state of the element (202). For example, in conjunction with selecting the element 126 for deployment as the element 140 within the application GUI 138, the developer 110 may utilize the state capture selector 136 to invoke the element designation module 150 of the state manager 102, and thereby designate the element 126/140 as being associated with state capture and state restoration functionalities. For example, the application 118 may be described within the application metadata document 154, including the state capture definition 156 that defines a manner and extent to which the designated element 126/140 will be configured for state capture/restoration, and including a reference to the state metadata document 158 that will be used to store and restore the resulting, captured state content 160.

Specifically, following deployment of the application within a runtime environment, and in response to an invocation of the state capture functionality, a captured state of the element may be stored (204). For example, the state capture functionality may be invoked in response to selection of the state capture invoker 146, in a manner specified by the capture selector module 152 of the state manager 102. In other example implementations, the state capture functionality may be invoked automatically or implicitly, e.g., in response to a change of the value 144 by the user 120 (e.g., a selection of the checkbox or an entry of text by the user 120). The actual capturing and storing of the specified application state may be executed by the capture invocation module 162, e.g., invoking a suitable extraction script(s) for extracting, e.g., the value 144 for storage within the state capture content 160.

A state restoration request for the captured state may be received by way of the state restoration functionality and following a redeployment of the application, with an update to the element that was included as part of an update to the application within the application design environment (206). For example, the state restoration module 164 may be configured to receive a state restoration request, e.g., by way of the state restoration requestor 148.

The captured state may be restored to the updated element, in response to the state restoration request, within the runtime environment (208). For example, the state restoration module 164 may utilize the state capture definition 156 to enable loading of the state capture content 160 in conjunction with rendering of the state metadata document 158 by the rendering engine 116, and in conjunction with the overall rendering of the application 118 based on the application metadata document 154.

Figure 3:
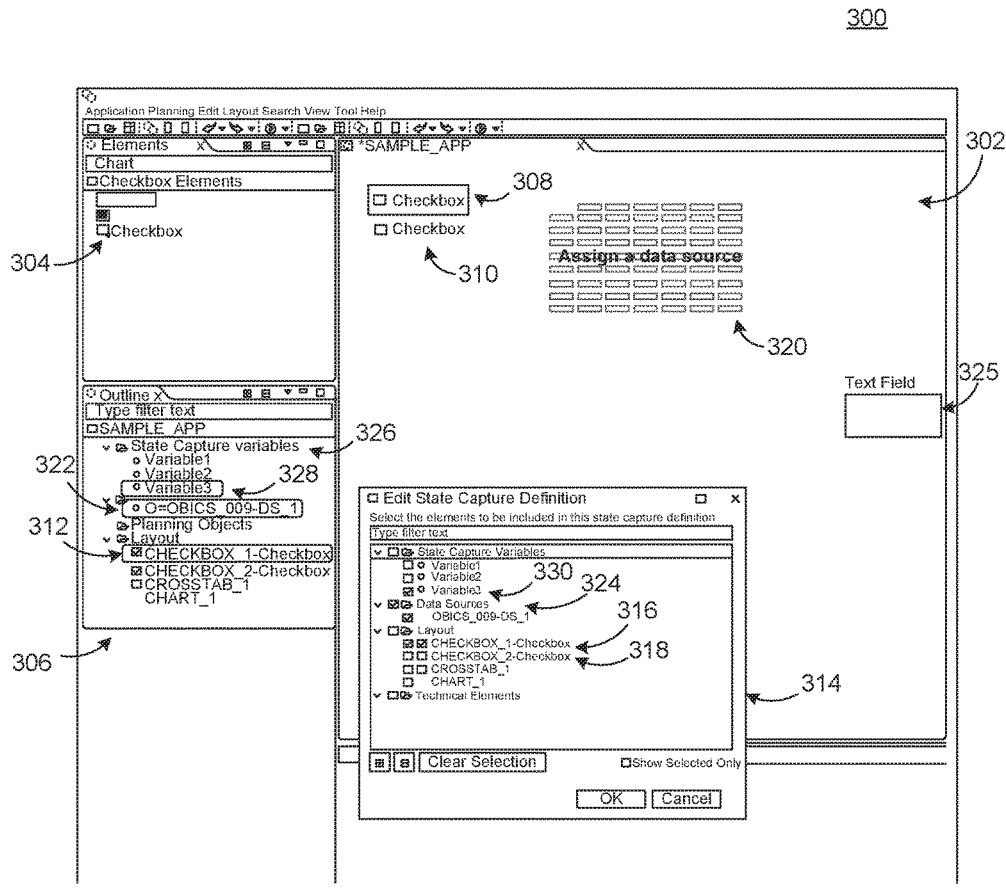
FIG. 3 is an example screenshot during a design phase of operations of the system of FIG. 1.

FIG. 3 is a screenshot illustrating an example implementation of the system 100 of FIG. 1. In the example of FIG. 3, a portion 302 represents a canvas, such as the canvas 130 of FIG. 1. A portion 304 represents an example of a palette, such as the palette 124 of FIG. 1. A portion 306 represents an outline view, such as the outline 128 of FIG. 1.

In the example of FIG. 3, a checkbox 308 and a checkbox 310 are illustrated as having been added to the canvas 302 from the elements 304. In other words, as may be understood from the above description of FIG. 1, the checkboxes 308, 310 should be understood to represent instances of a generic checkbox element included within the element 304, so that an application being designed will ultimately include both of the checkboxes 308, 310 as user elements.

As also described above with respect to the outline 128 of FIG. 1, and as illustrated in FIG. 3, the outline 306 will, like the canvas 302, include reference to at least some of the various elements placed from the elements 304 within the canvas 302. In particular, as shown, the outline 306 includes elements for the checkboxes 308, 310. More specifically, a checkbox representation 312 for the checkbox 308 is illustrated as being designated for inclusion within a state capture window 314. That is, the state capture window 314 corresponds to the state capture selector 136 of FIG. 1, and provides the developer 110 with the described ability to designate individual, selected elements for inclusion within a state capture definition.

In the example of FIG. 3, the state capture window 314 is illustrated as including all of the elements in the outline view, each such element being selectable for inclusion within the state capture definition. Consequently, in the example, the checkbox 316 within the state capture window 314 is illustrated as having been selected by the developer for inclusion within the state capture definition. In contrast, a checkbox reference 318 to the checkbox 310 is not selected for inclusion within the state capture definition, and a current state of the checkbox 310 during runtime will be ignored for purposes of the state capture techniques described herein.

Thus, it may be observed that the developer 110 is provided with a highly specialized ability to select and designate only those elements that are necessary or desirable for associating with potential state captures by the user 120. For example, a possibility that future changes to the associated application being designed will render previously created state capture definitions obsolete is minimized, and an amount of computing resources dedicated to enabling the state capture functionality described herein will be minimized, as well.

Further in FIG. 3, an element 320, which may represent a table (e.g., a cross table, or a pivot table), is included to illustrate an example of scenarios in which non-visual elements may be included in the application under development. That is, the element 320 may be understood to be associated with (e.g., use data from) a data source to be assigned for use within the application under development. As referenced with respect to FIG. 1, such an assigned data source may represent the type of non-visual element that may be selected from the element 304, and that may be used during runtime operations of the application being designed, but that may not be explicitly visible, as such, within either or both of the canvas 302 and the application GUI 138. Instead, the selected data source may be observable within the outline 306, as illustrated by an outline element 322 identifying the specific data source as a hypothetically-named data source OBICS_009.

Accordingly, the developer 110 may utilize the state capture window 314 to designate the referenced data source as being included within a state capture definition for the application being designed. Specifically, as illustrated, an element 324 of the state capture window corresponding to the element 322 of the outline 306 provides a selectable option for the developer 110 to designate the referenced data source for eligibility within future state capture selections made by the user 120.

In the examples described thus far, the elements 308, 322 are designated for state capture eligibility, so that any state capture designations made by the user 120 will capture a current value or state of the element 308, 322, even if properties of the elements 308, 322 have been changed during intervening updates to the application in question by the developer 110.

For example, the checkbox 308 may be configured to have properties such as, e.g., size, color, label, or associated, scripted events. Even if the developer 110 changes some or all of these properties during application upgrades that occur subsequently to a state capture designation made by the user 120, the saved state of the element 308 will be restored in response to a request from the user 120 for such state restoration. For example, if the checkbox 308 is originally labeled "checkbox 1" during an initial deployment of the application being designed, and the user 120 saves a state of the checkbox 308 as having been checked, then it may occur that the developer 110 changes the label of the checkbox 308 to "first checkbox." When the user 120 subsequently reloads the application and request restoration of the previously-captured state value of the checkbox 308, the checkbox 308 will revert to the checked state, notwithstanding the intervening change to the label of the checkbox 308.

In other example implementations, however, it may be possible that the developer 110 will wish to change an element entirely (e.g., replace the element) during upgrades to the application under design. For example, FIG. 3 illustrates an example text field 325 for receiving text during a runtime of the application under design. The text field 325 thus represents another type of element selected from the element 304, which may be deployed during runtime of the designed application.

FIG. 3 thus illustrates examples which account for a possibility that the type of element associated with receiving entered text may change, to thereby decouple a captured state value from both an original element used to receive the state value, and a subsequent/changed element(s) to which the state value might later be restored. FIG. 3 illustrates that a state capture variable may be used within the state capture window 314 for these purposes.

Specifically, the outline 306 is illustrated as including a plurality of state capture variables 326, including a specific state capture variable 328 that may then be designated within the state capture window 314 as being associated with a state capture variable 330 that corresponds to the text field 325. For example, the state capture variable 328 may have a type 'string,' and may be used to save a string of text data entered into the text field 325.

During later runtime operations of the application being designed, a user may enter text within the text field 325, and may then designate a state capture for capturing the value of the entered text. The entered text will thus be saved in association with the state capture definition, and using the designated state capture variable 330.

The developer 110 may subsequently make a change to the text field 325. For example, the developer 110 may select an entirely different type of element for receiving text from the user 120, referred to herein generically as a different type of text element, "text area." When the user 120 later returns and requests restoration of the captured text that was saved with respect to the text field 325, then the previously-entered text, saved as the value for the variable 330, may be loaded into the newly-included text area element. In this way, the user 120 may be provided with an ability to restore captured state data, even when the actual element used to receive the original state data has been changed during intervening application upgrades.

Although the above examples are provided with respect to two different text entry elements, it will be appreciated that the captured state may be restored to changed elements, even when the changed elements are of an entirely different type of element. For example, the state restoration module 164 may include a mapping script to translate or map the captured state from an original element to a changed element. For example, a captured state describing a positive value for a checkbox, such as the checkbox 308, may be mapped to the word "yes" when the checkbox 308 is changed to a text entry field.

Figure 4:
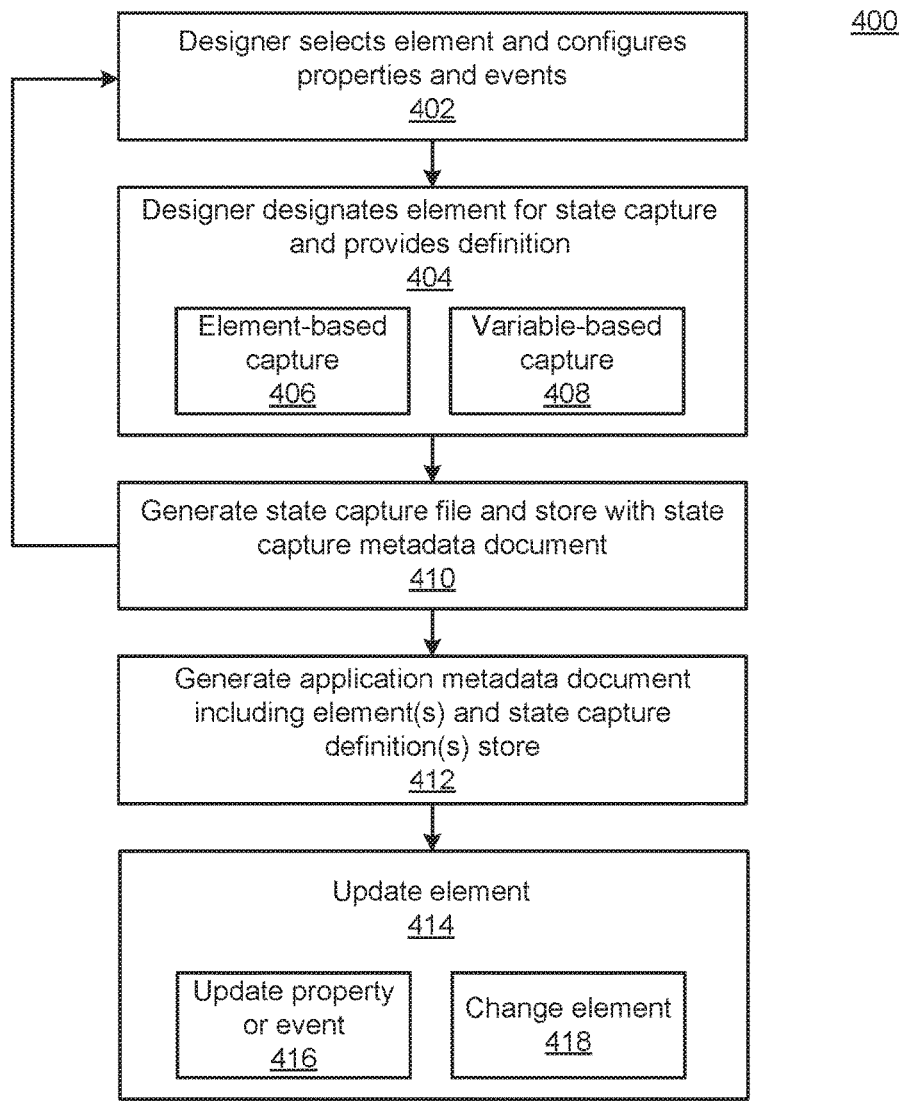
FIG. 4 is a flowchart illustrating more detailed example operations during the design phase of the system of FIG. 1.

FIG. 4 is a flowchart 400 illustrating example operations of the developer 110 during application design and update operations. That is, the example of FIG. 4 should be understood to represent actions of the developer 110 over the course of multiple deployments of the application 118, including intervening state capture requests from the user 120.

In the example of FIG. 4, the developer 110 initially selects one or more elements and configures associated properties and events for the selected elements (402). For example, the developer 110 may select the checkbox 308, or the text field 325, as illustrated and described above with respect to FIG. 3.

The developer may then designate each desired element for state capture, and provide an associated state capture definition (404). For example, the developer 110 may designate the selected element for element-based capture (406), in which captured state data is saved with respect to a particular element, irrespective of other properties or events associated with the element. In other described examples, the element may be designated for variable-based capture (408), in which the captured state is defined with respect to a designated state capture variable, and independently of the particular element used to receive the captured state data.

Subsequently, a corresponding state capture file may be generated and stored within a state capture metadata document (410). That is, as referenced above with respect to FIG. 3, and described in more detail below, with respect to FIGS. 5 and 6, a state capture definition 156 stored in conjunction with the application metadata document 154 for the application 118 may be used to reference the state metadata document 158. As described, the state metadata document 158 may be used as a location for storage of captured state content 160, in which one or more state capture files are persisted.

As illustrated in FIG. 4, the operations 402-410 may continue iteratively, as the developer 110 selects, includes, and configures all of the elements of the application 118 being designed. Of course, as described above with respect to FIGS. 1 and 3, the developer 110 may also include elements that are not designated for future state capture operations, in which case such elements will simply be included, but will not be associated with the state capture definition, or the associated state metadata document 158.

Further, although not separately illustrated in the example of FIG. 4, the developer 110 also may include desired techniques for executing state capture and restore functionalities. For example, the developer 110 may include the state capture invoker 146 and the state restoration requestor 148 as selectable buttons within the application GUI 138. The developer 110 may configure, label, size, and position such buttons as desired within the application GUI 138, in a manner similar to any other element included therein.

Once all of the application elements have been included and configured, the application metadata document (e.g., the application metadata document 154 of FIG. 1) may be generated, including all of the various elements and any associated state capture definitions 156 (412). As illustrated, the application metadata document 154 may then be stored at the application server 112.

At a later time, the developer 110 may decide to update a particular, selected element (414). For example, the developer 110 may update a property or event associated with the element (416), which does not impact the associated state capture definition for the element in question. In other examples, the developer 110 may change the element entirely (418). Similarly, the developer 110 may change a property of a particular element that impacts an associated captured state.

In all such examples, the developer 110, as described, has the ability to define the state capture with respect to either a particular element, or with respect to an associated state capture variable. The developer 110 may choose which state capture technique to utilize, based, for example, on an expectation of the developer 110 with respect to a likelihood with which the element in question will change over time. Moreover, the developer 110 has the ability to change the technique used for state capture with respect to a particular element/state.

In this regard, the developer 110 may associate the state capture definition 156 with a version number and version history, in case state capture operations are changed over time. For example, if the developer 110 designates a set of elements for state capture within a first version of the state capture definition 156, and then desires to make changes to the included elements, or properties thereof, with respect to the various state capture operations described herein, then the developer 110 may designate the state capture definition 156 as having a second version, so that previous state capture operations defined with respect to the first version are automatically ignored.

Figure 5:
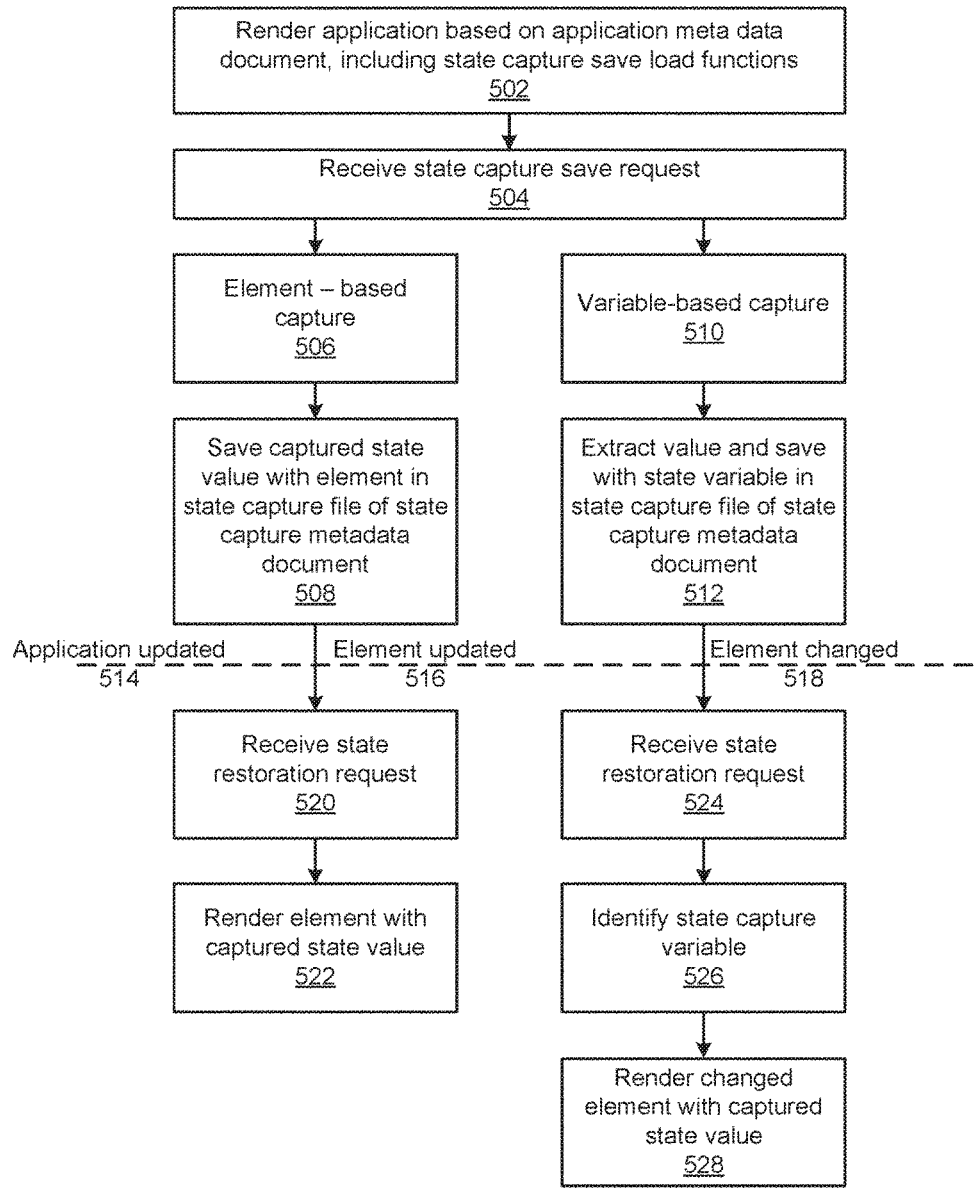
FIG. 5 is a flowchart illustrating more detailed example operations during a runtime phase of the system of FIG. 1.

FIG. 5 is a flowchart 500 illustrating example operations of the system 100 in conjunction with use of the application 118 by the user 120. In particular, as described in detail below, FIG. 5 illustrates example operations of the system 100 in conjunction with uses of the application 118 by the user 120 over the course of the plurality of rounds of development/deployment described above with respect to FIG. 4.

In the example of FIG. 5, in response to an initial request of the user 120 for the application 118, the runtime environment 114 may proceed to execute the rendering engine 116 to render the application GUI 138 (502). Specifically, as illustrated and described, the rendering engine 116 may proceed to render the application metadata document 154.

As also illustrated and described with respect to FIG. 1, the application metadata document 154 may include and specify associated state capture save and restore functions. For example, the state capture save may be initiated using the state capture invoker 146, and state restoration may be implemented using the state restoration requestor 148 of FIG. 1.

Accordingly, the application GUI 138, including the element 140 and associated property 142 may be rendered, after which a specific state capture save request may be received (504). For example, the user 120 may enter the value 144, and then select the state capture invoker 146, such as when the state capture invoker 146 represents a selection button that is clicked by the user 120. As described, a state capture save request also may be received implicitly, in response to the receipt of the value 144, depending on a manner in which the state capture invoker 146 has been configured.

If the requested state capture has been designed by the developer 110 as an element-based capture (506), then the captured state value may be stored with reference to the relevant element, within the corresponding state capture file of the state capture metadata document 158. For example, the corresponding, updated state capture file may be stored within the state capture content 160 of FIG. 1.

Meanwhile, if the requested state capture save request was received with respect to an element designated for a variable-based capture (510), then a corresponding state value extraction script may be executed to extract the captured state data for saving in conjunction with a corresponding state variable, again within a corresponding state capture file of the state capture metadata document 158 (512).

At a later time, the application 118 may be updated (514). For example, the element may be updated (516), or an element may be changed (518).

In examples in which the element has been updated (516), then a state restoration request may be received (520). For example, the user may invoke the state restoration requestor 148 with respect to the element 140. The element 140 may then be rendered with the previously-captured state value (522). In particular, the application metadata document 154 may be rendered in conjunction with the state metadata document 158, so that the relevant portions of the state capture content 160 are used to populate the specified value of the rendered, changed element.

In examples in which the element is changed (518), then again, a state restoration request may be received (524). For example, the state restoration requestor 148 may be invoked.

The relevant state variable may then be identified (526). For example, the relevant state variable may be identified automatically, in response to selection of the changed element that corresponds to the original element, by way of the state capture variable in question. In some example implementations, the state restoration requestor 148 may be designed and implemented with respect to a plurality of application elements. For example, in response to selection of the state restoration requestor 148, the application GUI 138 may be used to render some or all of the application elements designated for state capture functionality, so that the user 120 may select an appropriate, desired element.

The changed element may thus be rendered with the previously-captured state value (528). For example, again, the rendering engine 116 may render the application 118 from the application metadata document 154, using the state capture definition 156 to reference the state metadata document 158 and determine and select appropriate portions of the state capture content 160.

Figure 6:
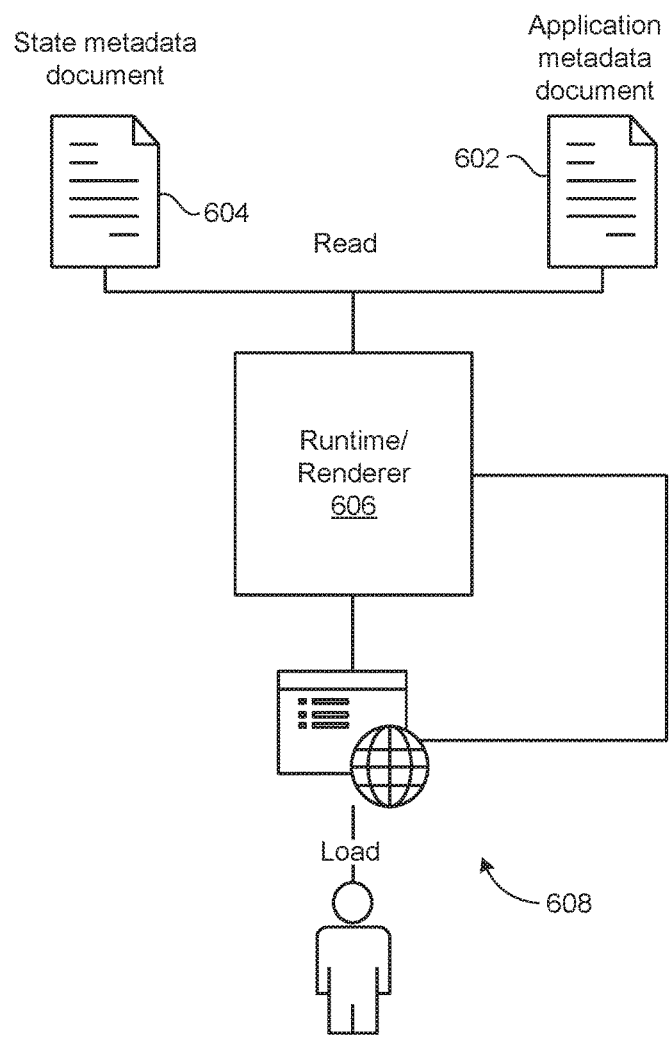
FIG. 6 is a block diagram illustrating aspects of a runtime phase of the system of FIG. 1.

FIG. 6 is a block diagram or a system 600 illustrating a specific implementation of the system 100 of FIG. 1. In the example of FIG. 6, an application metadata document 602 represents the example application metadata document 154 of FIG. 1, while a state metadata document 604 represents an example of the state metadata document 158 of FIG. 1.

In the example of FIG. 6, it is assumed that the application metadata document 602 is constructed using a suitable, descriptive metadata language used by the rendering engine 606 of FIG. 6 to load and render the corresponding application in a user context 608. Then, the state value metadata document 604 may also be constructed using the same or similar metadata language, such as the eXtensible markup language (XML).

For example, an example in which the application element in question is a checkbox element, such as the checkbox element 308 of FIG. 3, then relevant portions of the state value metadata document 604 may be represented using, for example, the following code portion 1:

---
Code Portion 1
---
```
<?xml version="1.0" encoding="UTF-8"?>
<parameterList>
  <param name="BOOKMARK_VERSION" value="1" />
  <param name="ITEM">
    <param index="1" name="DELTA_PROPERTY_UPDATE"
      value="">
      <param name="CHECKED" value="true" />
    </param>
    <param name="GROUP" value="ITEM" />
    <param name="INIT_PARAMETERS" />
    <param name="NAME" value="CHECKBOX_1" />
    <param name="TYPE" value="CHECKBOX_COMPONENT" />
  </param>
</parameterList>
```
---

As illustrated in code portion 1, the only information persisted within the state capture content 160 is the name of the changed element, and the name of the changed element property. In other words, as described above, and illustrated in code portion 1, the element "checkbox" may have many properties, some or all of which may changed during runtime. The only information persisted in the example, however, is the changed property value defined within code portion 1 (i.e., a checked or unchecked state of the checkbox). Consequently, as described, the checkbox element may be changed by the developer 110 in the future, and other elements may be added or removed, but the captured state of the checkbox element may nonetheless be restored.

Specifically, the runtime/rendering engine 606 of FIG. 6 may be configured to retrieve the relevant application state, by combining the documents 602, 604. For example, the user 120 may select or designate a requested state restoration, such as by selecting a particular state capture file and requesting an update from the rendering engine 116. The rendering engine 116 may then utilize the state capture definition 152 to identify the requested state data from the state capture content 160 of the state metadata document 158. The rendering engine 116 may then proceed to align the state of the application 118 and render a corresponding, updated view of the relevant element with its restored state value.

Figure 7:
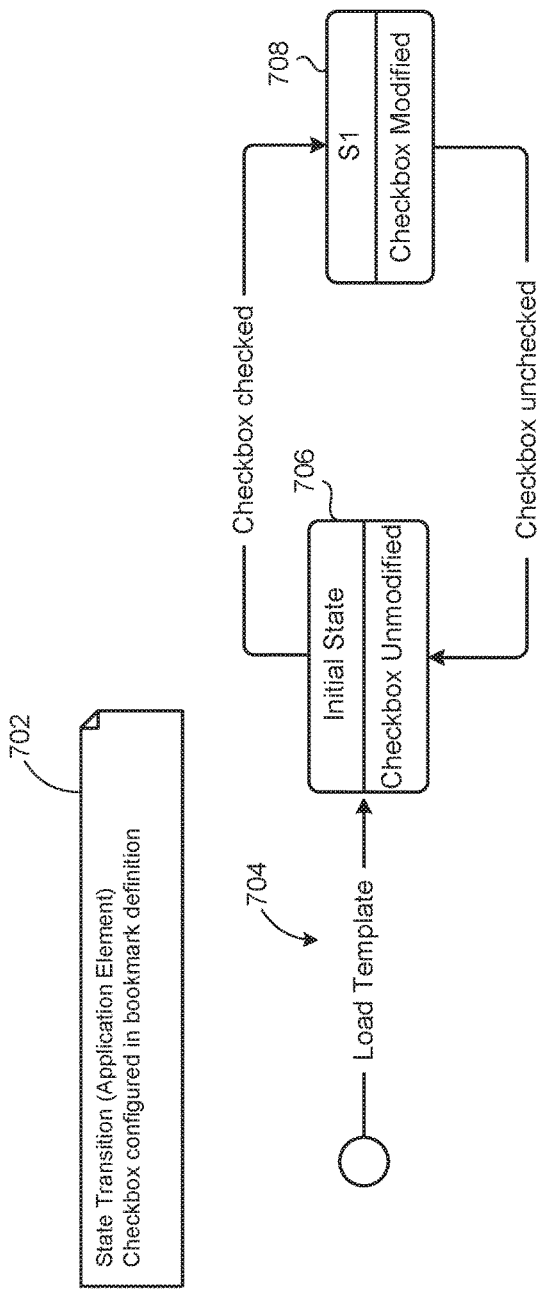
FIG. 7 is a block diagram of a state transition diagram characterizing state transition operations of the system of FIG. 1.

FIG. 7 is a state transition diagram illustrating example operations of the system 100 of FIG. 1. In particular, the example of FIG. 7 illustrates example operations of the capture invocation module 162.

In the example of FIG. 7, it is assumed that a particular application element configured for state capture operations includes a checkbox that is configured within the corresponding state capture definition, and that FIG. 7 illustrates a state transition 702 thereof. During rendering of the application, the corresponding element template may be loaded (704), e.g., from the corresponding application metadata document 154 of FIG. 1, or 602 of FIG. 6.

In FIG. 7, a node 706 illustrates an initial state of the loaded element that is illustrated as having an unmodified or unchecked state of the element. The application may then transition out of this initial state when the checkbox is checked, to enter into a modified/checked state represented by node 708. At this stage, the checked state of the checkbox element may be saved within the corresponding state capture file. If the checkbox is subsequently unchecked, then the checkbox element will return to its initial state, represented by the node 706. At this point, the content of the corresponding state content file will be restored to the original state of empty/unchecked.

FIG. 7 illustrates that the capture invocation module 162 may be implemented as a difference engine, or a delta engine, that is configured to save only a current state of a corresponding application element, as opposed, for example, to saving a history of check/uncheck operations that may be implemented by the user 120.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or median of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one processor, are configured to cause at least one computing device to at least:

receive a state capture designation for an element of an application within an application design environment, indicating that the application, once deployed, will include a state capture functionality for capturing a state of the element and a state restoration function for restoring the state of the element;

persist, in response to the state capture designation being received, the state capture designation for the element within a state capture definition of an application metadata document;

store, following deployment of the application within a runtime environment and in response to an invocation of the state capture functionality, a captured state of the element, wherein the state capture designation is made with respect to a state metadata document configured to store state capture content including the captured state;

receive a state restoration request for the captured state, received by way of the state restoration functionality and following a re-deployment of the application with an update to the element that was included as part of an update to the application within the application design environment, wherein the update to the element includes a change to an element type of the element from an original element type to an updated element type, and wherein the element and the updated element are included within the application metadata document that is rendered within the runtime environment to provide the application; and restore, in response to the state restoration request being received, the captured state to the updated element within the runtime environment, wherein to restore the captured state to the updated element, the captured state is translated from the original element type to the updated element type.

2. The computer program product of claim 1, wherein the instructions, when executed, are further configured to cause the at least one computing device to at least:

receive the state capture designation including persisting the state capture designation for the element from among a plurality of elements of the application, wherein the element is individually selectable from among the plurality of elements for receiving the state capture designation.

3. The computer program product of claim 1, wherein the instructions, when executed, are further configured to cause the at least one computing device to at least:

receive the state capture designation including receiving a state capture selector configured to execute the invocation of the state capture functionality, the state capture selector including a user-selectable graphical element rendered in conjunction with the element within the runtime environment.

4. The computer program product of claim 1, wherein the instructions, when executed, are further configured to cause the at least one computing device to at least:

receive the state capture designation including receiving a state restoration requestor configured to invoke the state restoration functionality, the state restoration requestor including a user-selectable graphical element rendered in conjunction with the element within the runtime environment.

5. The computer program product of claim 1, wherein the update to the element includes a change to at least one property of the element, and wherein the instructions, when executed, are further configured to cause the at least one computing device to at least:

store the captured state with reference to the element; and
restore the captured state to the updated element, based on the reference.

6. The computer program product of claim 1, wherein the update to the element includes a change of the element and the updated element includes a different element, and wherein the instructions, when executed, are further configured to cause the at least one computing device to at least:

store the captured state with reference to a state capture variable; and
restore the captured state to the updated element, based on the reference to the state capture variable.

7. The computer program product of claim 1, wherein the state capture definition includes the element among a plurality of elements designated as having the state capture functionality.

8. The computer program product of claim 1, wherein the instructions, when executed, are further configured to cause the at least one computing device to at least:

restore the captured state to the updated element, including rendering a combination of the application metadata document and the state metadata document within the runtime environment.

9. A computer-implemented method, comprising:

receiving a state capture designation for an element of an application within an application design environment, indicating that the application, once deployed, will include a state capture functionality for capturing a state of the element and a state restoration function for restoring the state of the element;

persisting, in response to the receiving the state capture designation, the state capture designation for the element within a state capture definition of an application metadata document;

storing, following deployment of the application within a runtime environment and in response to an invocation of the state capture functionality, a captured state of the element, wherein the state capture designation is made with respect to a state metadata document configured to store state capture content including the captured state;

receiving a state restoration request for the captured state, received by way of the state restoration functionality and following a re-deployment of the application with an update to the element that was included as part of an update to the application within the application design environment, wherein the update to the element includes a change to an element type of the element from an original element type to an updated element type, and wherein the element and the updated element are included within the application metadata document that is rendered within the runtime environment to provide the application; and restoring, in response to the receiving the state restoration request, the captured state to the updated element within the runtime environment, wherein restoring the captured state to the updated element comprises translating the captured state from the original element type to the updated element type.

10. The method of claim 9, further comprising persisting the state capture designation for the element from among a plurality of elements of the application, wherein the element is individually selectable from among the plurality of elements for receiving the state capture designation.

11. The method of claim 9, wherein the update to the element includes a change to at least one property of the element, and wherein the method further comprises:

storing the captured state with reference to the element; and
restoring the captured state to the updated element, based on the reference.

12. The method of claim 9, wherein the update to the element includes a change of the element and the updated element includes a different element, and wherein the method further comprises:
  storing the captured state with reference to a state capture variable; and
  restoring the captured state to the updated element, based on the reference to the state capture variable.

13. The method of claim 9, wherein
  the state capture definition includes the element among a plurality of elements designated as having the state capture functionality.

14. The method of claim 9, further comprising:
  restoring the captured state to the updated element, including rendering a combination of the application metadata document and the state metadata document within the runtime environment.

15. A computer program product, the computer program product being tangibly embodied on a non-transitory computer-readable storage medium and comprising instructions that, when executed by at least one processor, are configured to cause at least one computing device to at least:
  provide a plurality of selectable elements within an application design environment;
  receive a selection of an element from the plurality of selectable elements for inclusion within an application;
  receive a state capture designation individually designating the element from among the plurality of selectable elements as having a state capture functionality;
  persist, in response to the state capture designation being received, the state capture designation for the element within a state capture definition of an application metadata document;
  deploy the application within a runtime environment, including rendering the element and receiving a state change to a state of the rendered element;
  receive an invocation of the state capture functionality and capture the state of the rendered element, wherein the state capture designation is made with respect to a state metadata document configured to store state capture content including the captured state;
  receive an update to the element within the application design environment, wherein the update to the element includes a change to an element type of the element from an original element type to an updated element type, and wherein the element and the updated element are included within the application metadata document that is rendered within the runtime environment to provide the application;
  re-deploy the application within the runtime environment, including rendering the updated element; and
  restore the state of the rendered, updated element using the captured state, wherein to restore the captured state to the updated element, the captured state is translated from the original element type to the updated element type.

16. The computer program product of claim 15, wherein the state capture designation designates the element as having a state restoration functionality, and wherein the instructions, when executed, are further configured to cause at least one computing device to at least:
  execute the state restoration functionality to restore the state of the rendered, updated element, in response to a user request to restore the captured state.

17. The computer program product of claim 15, wherein the instructions, when executed, are further configured to cause at least one computing device to at least:
  restore the captured state to the rendered, updated element, including rendering a combination of the application metadata document and the state metadata document within the runtime environment.

* * * * *